UNITED STATES PATENT OFFICE.

CHARLES DE LA HARPE, CHARLES VAUCHER, AND HERMAN LORÉTAN, OF BASLE, SWITZERLAND, ASSIGNORS TO DYE-WORKS, FORMERLY L. DURAND, HUGUENIN & CO., OF SAME PLACE.

GALLOCYANIN SULFITE DYE AND PROCESS OF MAKING SAME.

SPECIFICATION forming part of Letters Patent No. 662,224, dated November 20, 1900.

Application filed July 19, 1900. Serial No. 24,183. (Specimens.)

*To all whom it may concern:*

Be it known that we, CHARLES DE LA HARPE, CHARLES VAUCHER, and HERMAN LORÉTAN, chemists, citizens of the Swiss Republic, and residents of Basle, Switzerland, have invented certain Improvements in the Manufacture of Gallocyanin Dyes, of which the following is a clear and complete specification.

We have found that the dyestuff obtained by sulfonating the gallocyanin resulting from the action of a salt of nitrosodialkylanilin upon the product of reaction of tannin with an aromatic amin of the benzene series gives by its treatment with a neutral or acid sulfite a new coloring-matter which is chemically and physically different from the original dyestuff and possesses certain technical advantages on account of the deep-blue shades which it produces on chromium mordanted fibers, as well as of its fastness to soap and light. The method for the manufacture of this dyestuff is the same as that described in the Letters Patent Nos. 613,578 and 638,576, the sole difference being in the initial dyestuff, since the primary body treated is a sulfonated anilidogallocyanin obtained by sulfonating in the usual way the product of the action of a salt of a nitrosodialkylanilin on gallanilid or one of its homologues. The new coloring-matter thus obtained is in the form of a greenish paste or powder soluble in water and soluble in concentrated sulfuric acid, giving a pale color a little dichroic, a solution which with the addition of an oxidant turns to intense blue.

The new coloring-matter is easily applied for printing or for dyeing and gives very dense shades, especially on chromium mordanted fibers.

The following examples illustrate the manufacture of the new coloring-matter:

Example I: Fifty kilos of the sulfoderivative of the gallocyanin resulting from the action of nitrosodimethylanilin hydrochlorid on gallanilid, four hundred liters of water, and 40 kilos of neutral sodium sulfite are introduced successively into an enameled autoclave or other suitable vessel. After the mixture has been heated for some hours to a temperature of 100° centigrade, for instance, the transformation is effected and the mass takes a greenish color, which turns to violet-black on contact with the air.

Example II: Fifty kilos of the sulfoderivative of the gallocyanin resulting from the action of nitrosodimethylanilin hydrochlorid on gallanilid, four hundred liters of water, and forty-five kilos of sodium bisulfite at 38° to 40° Baumé are introduced successively into an enameled autoclave, and the mixture is heated for several hours at 90° to 100° centigrade or left for a long time to itself until the mass assumes a greenish color.

As the action of the sulfites or bisulfites upon the sulfogallocyanin specified can take place more or less completely at very different temperatures we do not intend to thereby limit our invention only to those indicated in the examples.

What we claim is—

1. The process for the manufacture of a new coloring-matter derived from the sulfoderivative of a gallocyanin resulting from the action of a nitrosodialkylanilin salt upon the reaction product of tannin with an aromatic amin of the benzene series, the said process consisting in treating the said sulfonated gallocyanin with a sulfite, substantially as described.

2. The process for the manufacture of a new coloring-matter by treating with a sulfite the dyestuff obtained by sulfonating the gallocyanin resulting from the action of nitrosodialkylanilin salt upon gallanilid, substantially as described.

3. The process for the manufacture of a new coloring-matter by treating with a sulfite the dyestuff obtained by sulfonating the gallocyanin resulting from the action of nitrosodimethylanilin chlorid upon gallanilid, substantially as described.

4. As a new article of manufacture, the herein-described coloring-matter, derived from a sulfonated anilidogallocyanin, the said coloring-matter giving in dyeing and printing on chromium mordanted fibers very deep-blue shades fast to soap and to light and being in dry state a greenish powder soluble in water and furnishing with concentrated sulfuric acid a pale solution a little dichroic, which turns to blue by the addition of an oxidizing agent, substantially as set forth.

In witness whereof we have hereunto signed our names this 6th day of July, 1900, in the presence of two subscribing witnesses.

CHARLES DE LA HARPE.
  CHARLES VAUCHER.
  HERMAN LORÉTAN.

Witnesses:
 GEORGE GIFFORD,
 AMAND RITTER.